(12) United States Patent
Vavilala et al.

(10) Patent No.: US 12,701,143 B2
(45) Date of Patent: Aug. 4, 2026

(54) SECURITY POLICY GENERATION AND ENFORCEMENT FOR DEVICE CLUSTERS

(71) Applicant: Ordr Inc., Santa Clara, CA (US)

(72) Inventors: Krishna Kumar Vavilala, Bangalore (IN); Vijayaraghavan Doraiswami, Santa Clara, CA (US); Vivekanandan Vinayagam, San Ramon, CA (US); Sheausong Yang, Saratoga, CA (US); Vinod Arjun, Bengaluru (IN); Gnanaprakasam Pandian, Cupertino, CA (US)

(73) Assignee: Ordr Inc., Santa Clara, CA (US)

( * ) Notice: Subject to any disclaimer, the term of this patent is extended or adjusted under 35 U.S.C. 154(b) by 1037 days.

(21) Appl. No.: 17/163,770

(22) Filed: Feb. 1, 2021

(65) Prior Publication Data

US 2022/0247786 A1 Aug. 4, 2022

(51) Int. Cl.
*H04L 9/40* (2022.01)
*G06N 20/00* (2019.01)

(52) U.S. Cl.
CPC ............. *H04L 63/20* (2013.01); *G06N 20/00* (2019.01); *H04L 63/0227* (2013.01)

(58) Field of Classification Search
CPC ...... H04L 63/20; H04L 63/0227; G06N 20/00
See application file for complete search history.

(56) References Cited

U.S. PATENT DOCUMENTS

| | | | | |
|---|---|---|---|---|
| 10,412,434 | B1 * | 9/2019 | Matthews | .......... H04N 21/4394 |
| 10,581,888 | B1 * | 3/2020 | Agranonik | .............. H04L 63/02 |
| 2018/0288063 | A1 * | 10/2018 | Koottayi | ................. G06F 21/50 |
| 2018/0336509 | A1 * | 11/2018 | Guttmann | .......... G06F 21/6218 |
| 2019/0068627 | A1 * | 2/2019 | Thampy | .............. H04L 63/1425 |
| 2020/0092296 | A1 * | 3/2020 | Brinckman | ......... H04W 12/086 |
| 2020/0100145 | A1 * | 3/2020 | Enqvist | .............. H04L 47/2425 |
| 2021/0073909 | A1 * | 3/2021 | Le Roux | ................. G06N 5/01 |
| 2021/0176125 | A1 * | 6/2021 | Kyriannis | .......... H04L 41/0813 |
| 2021/0392171 | A1 * | 12/2021 | Srinivas | ................. G06N 5/047 |
| 2022/0224722 | A1 * | 7/2022 | Sun | .......................... H04L 63/20 |
| 2022/0247786 | A1 * | 8/2022 | Vavilala | ................. G06N 20/00 |

* cited by examiner

*Primary Examiner* — Shewaye Gelagay
*Assistant Examiner* — Thomas A Carnes
(74) *Attorney, Agent, or Firm* — Invoke

(57) ABSTRACT

Techniques for generating and enforcing security policies for device clusters are disclosed. A security manager generates a plurality of clusters of devices for applying security policies. For each cluster of devices, the security manager trains a machine learning model to indicate whether a particular data flow associated with a device in the particular cluster of devices is allowed or denied. The security manager detects a data flow corresponding to a device. If the security manager determines that the device corresponds to a first cluster of devices, the security manager identifies a first trained machine learning model corresponding to the first cluster of devices. The security manager applies the first trained machine learning model to the first data flow to determine whether the first data flow is to be allowed or denied. The security manager allows or denies the first data flow based on the applying operation.

23 Claims, 6 Drawing Sheets

SECURITY POLICY GENERATION AND ENFORCEMENT FOR DEVICE CLUSTERS

TECHNICAL FIELD

The present disclosure relates to analyzing a system to identify devices and data flows, and to generate and enforce security policies for device clusters. In particular, the present disclosure relates to using a machine learning model to generate security policies for data flows to device clusters in a system and to select enforcement points for the security policies.

BACKGROUND

In a data network, there are many sources of data flows requesting access to devices within the system. Requests may originate from within the system, such as one virtual machine (VM) server requesting to communicate with another, or with a database in the data network. Requests may also originate from sources external to the data network, such as from imaging devices that store data in the data network or computing devices authorized to access the data network via the Internet. Identifying allowable or undesirable data flows to devices in the system is a time-consuming process requiring expertise about the nature of the system and the devices within the system. Typically, system experts monitor the system over a period of time and tag individual data flows as allowed or denied access to system devices in a process that requires a significant amount of trial and error. For example, a request by a social media Internet site may be identified by an expert as being undesirable, and the expert may generate and implement a policy to deny the social media site access to its intended destination in the system. The policy may interfere with another application being run by a client in the system. The expert may then make a judgement call as to whether the security provided by keeping the policy in force outweighs the client's requirements to communicate with the social media site. Typically, each data flow in the system is subjected to a similar time-consuming process of tagging the data flow as "allowed" or "denied," observing the results in the system, and modifying the tags accordingly.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. ANALYZING DEVICES AND DATA FLOWS TO GENERATE AND ENFORCE SYSTEM SECURITY POLICIES
4. MACHINE LEARNING ENGINE TRAINING
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

One or more embodiments apply a combination of supervised and unsupervised machine learning techniques to allow or deny a detected data flow. In one or more embodiments, the system applies an unsupervised machine learning algorithm to cluster devices based on similarities in behavior. Alternatively, or in addition, the system may cluster the devices based on user input selecting a cluster of devices or shared attributes (e.g., location, time of use, etc.). The system defines policies for each device cluster using supervised machine learning algorithms. Specifically, the system trains a machine learning model based on data flows, with respective attributes, associated with devices within a device cluster. The data flows are either system-labeled or user-labeled as allowed or denied. The trained machine learning model then allows or denies detected data flows, associated with devices within the cluster, based on the attributes of the detected flows. The system may define policies for the devices, within the cluster, to allow or deny data flows based on the determinations of the trained machine learning model.

One or more embodiments select policy enforcement point(s) for allowing or denying data flows. The system may train a machine learning model with a set of data flows, with respective attributes, that are associated with corresponding policy enforcement points or types thereof. The trained machine learning model then selects one or more policy enforcement points for detected data flows based on the attributes of the detected flows. The system may define policies for the devices, within the cluster, to select policy enforcement point(s) based on the determinations of the trained machine learning model.

One or more embodiments described in this Specification and/or recited in the claims may not be included in this General Overview section.

2. System Architecture

Figure 1:
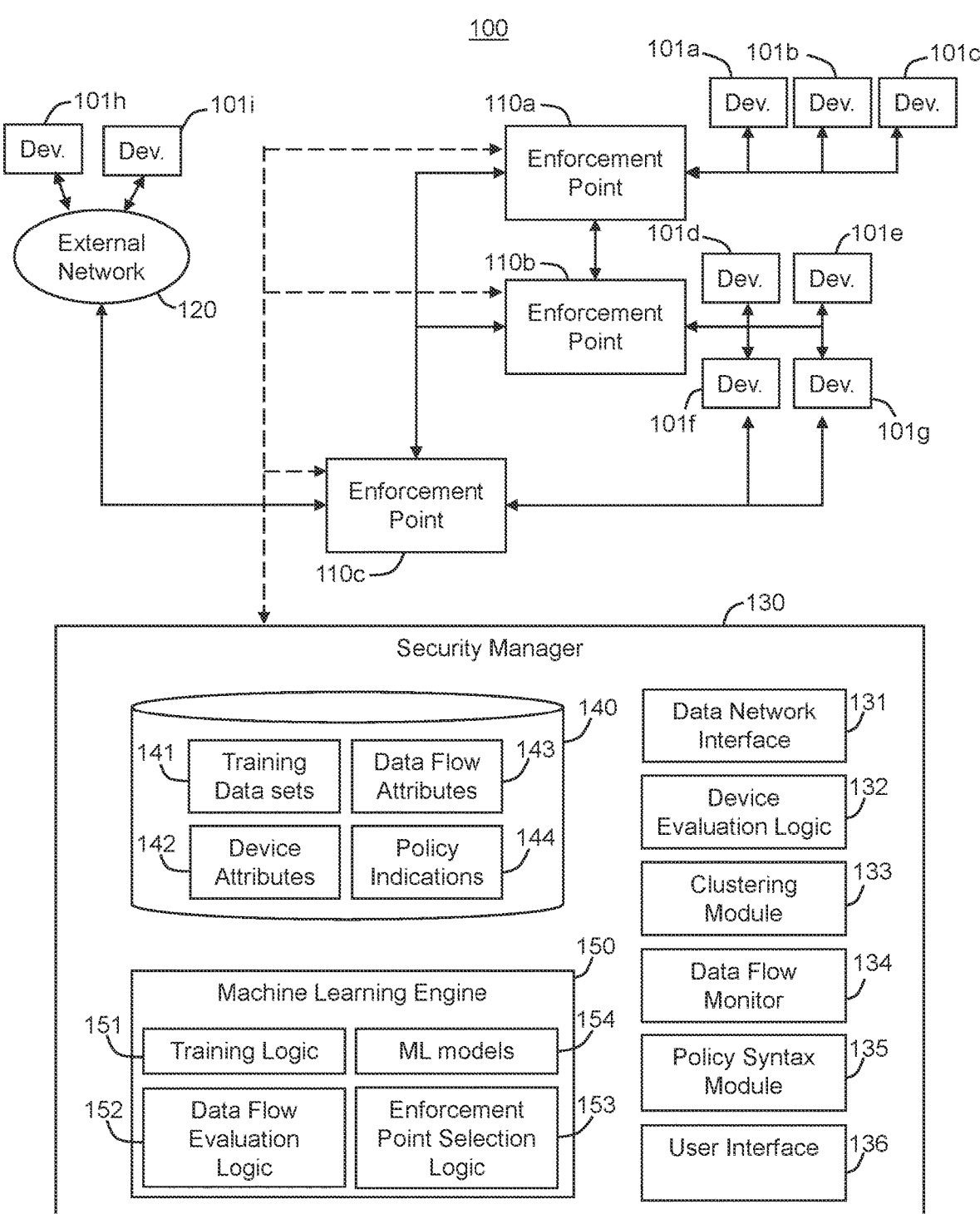
FIG. 1 illustrates a system in accordance with one or more embodiments.

FIG. 1 illustrates a system 100 in accordance with one or more embodiments. As illustrated in FIG. 1, system 100 includes devices 101*a*-101*i* and enforcement points 110*a*-110*c* for enforcing policies to allow and deny data flows to and from the devices 101*a*-101*i*. The system further includes a security manager 130 to monitor the system and generate a machine learning model to generate security policies to allow or deny data flows in the system and to select enforcement points for enforcing the security policies.

In one embodiment, the devices 101*a*-101*g* are devices for which the security manager 130 controls access by applying security policies to the enforcement points 110*a*-110*c*. For example, the devices 101*a*-101*c* may be databases, and the enforcement point 110*a* may be a switch or router that routes traffic to and from the databases. The security manager 130 may generate a security policy to be enforced by the enforcement point 110*a* to control access to the devices 101*a*-101*c*. In one embodiment, the devices 101*d* and 101*e* may be user terminals or application servers, and the devices 101*f* and 101*g* may be virtual machine (VM) servers to provide VMs to clients at a remote computing terminal. Enforcement point 110*b* may be a switch or router. Enforcement point 110*c* may be a firewall device that regulates data flows between a device connected to an external network 120 and the devices 101*a*-101*g*. Devices 101*h* and 101*i* may be user devices, equipment, servers, or any other device capable of communicating with other devices via the external network 120.

The security manager 130 includes a data network interface 131 to communicate with devices in the system 100, as represented by the dashed lines in FIG. 1.

Device evaluation logic 132 analyzes device attributes, such as behavior patterns of the devices, and identifies similarities among behavior patterns of the devices. Examples of device behavior patterns include: addresses accessed by a device, types of data stored or requested by the device, times of operation (e.g. particular hours of a day), functions performed by the device, applications running on the device, and data transmission requirements of the device.

A clustering module 133 analyzes the device attributes, including the behavior patterns, of the devices, and organizes the devices into device clusters according to common behavior patterns. For example, imaging machines that typically generate document images and typically access local computing devices may be formed into one cluster based on common behaviors (e.g. receiving access requests from common sources, sending images to common destinations, generating common file types). Databases having similar behaviors may be grouped into another cluster. Remote user terminals that access virtual machine servers in a data network and have similar behaviors may be grouped into another cluster.

In addition, or in the alternative, the clustering module 133 may cluster devices together based on user input selecting a cluster of devices. The clustering module 133 may cluster devices based on any shared attributes such as, for example, a geographic region, a room, a building, a department, a location, a time of use. When the user clusters devices together, the devices may all be of the same type, or the devices may be of different types. For example, a user may create a cluster for every device within a particular room. The devices in the room may include a handheld device, a medical imaging device, and a personal computer. In addition, if the security manager 130 detects a new device accessing the monitored network in the particular room, the security manager may automatically add the device to the device cluster. For example, if the security manager 130 senses a new laptop located in the room that has previously been defined as a defining attribute of a device cluster, the new laptop may automatically be added to the device cluster without further user input.

In one or more embodiments, the clustered devices may be located remotely from each other. For example, an organization may have one site with one imaging device and a geographically distant site with another imaging device. The imaging devices may typically receive requests from different devices at the different geographic locations. However, the clustering module 133 may still organize the imaging devices into the same cluster of devices based on similarity of behavior patterns of the imaging devices. In addition, application servers having similar behavior patterns may be clustered together, voice-transmission devices may be clustered together, etc.

In one or more embodiments, the clustering module 133 utilizes one or more machine learning models to generate the device clusters. In one embodiment, the clustering module 133 utilizes unsupervised machine learning processes, such as k-means clustering, to group all of the devices in the system into clusters according to respective attributes of the devices.

The security manager 130 monitors the data flow in the system using the data flow monitor 134. Monitoring the data flow may include identifying sources, destinations, and content of data requests and transmissions to or from the devices 101*a*-101*g* and through the enforcement points 110*a*-110*c*. The data flow monitor 134 may also identify which data flows are denied access to an intended destination by the enforcement points 110*a*-110*c*.

The security manager 130 includes a data repository 140. The repository 140 stores device attributes 142, including observed or obtained behavior patterns and clustering data.

The repository 140 further stores data flow attributes 143 obtained by observing the data flows directed to, or from, devices in the system 100. The data flow attributes 143 may also be obtained from historical data in other systems. Data flow attributes 143 may include, for example, the source, destination, file size, and other data flow information observed by the data flow monitor 134. The repository 140 stores policy indication information 144 identifying particular flows as allowed or denied. For example, a user may label a flow from a particular source as a malicious source that is to be denied access to any devices in the system. The data flow monitor 134 may observe the flow and the labeling of the flow and store the data flow attributes 143 and policy indication 144 in the data repository 140. In addition, information about data flow attributes 143 and policy indications 144 may be obtained from other systems. For example, the security manager 130 may obtain information about malicious viruses or malware from a third-party security service and may store data flow attributes 143, such as source information or other data flow identifying information, and corresponding policy indications (such as a policy preventing transmission of the data flow to deny a device transmitting the data flow access to the system) in the data repository 140.

A machine learning engine 150 may generate and store training data sets 141 using the device attributes 142, data flow attributes 143, and policy indications 144. For example, a training data set 141 may identify, for data flows observed over a predetermined period of time, which data flows were allowed to be transmitted to, or prevented from being transmitted to, devices in the system. The training data sets 141 may identify, for each data flow, attributes of the data flows. The training data sets 141 may further identify, for the device that is an intended destination of a data flow, to which clusters of devices a particular device belongs. The training data sets 141 may further identify which enforcement points were used to enforce security policies of allowing or denying the transmission of data flows to devices in the system.

Training logic 151 uses the training data sets 141 to train machine learning (ML) models 154 to identify a policy for a data flow—whether to allow or deny the data flow to be transmitted to an intended destination device. The ML models 154 also identify one or more enforcement points among the enforcement points 110a-110c in the system where the policy should be implemented.

In one or more embodiments, a user may provide feedback to the machine learning engine 150 via a user interface 136. For example, the machine learning engine 150 may apply a machine learning algorithm to a training data set 141 and output values for whether a particular flow should be allowed to be, or prevented from being, transmitted to a particular device cluster and where the security policy should be enforced. The security manager 130 may display results to the user via the user interface 136. The user may modify results, such as by changing a security tag for a particular type of data flow from "allowed" to "denied." The security manager 150 may update the training data sets 141 based on the user feedback, and the training logic 151 may generate a new set of ML models 154 based on the updated training data sets 141. The process may repeat until a final ML model 154 is generated. In addition, or in the alternative, the machine learning engine 150 may update the machine learning model by comparing output values to known values for particular data flows. In addition to providing feedback regarding data flows analyzed by the machine learning engine 150, a user may identify a new data flow as a data flow that should be allowed or denied. For example, the user may identify a new program running on a device that was not previously analyzed by the machine learning engine 150. The user may preemptively allow the data flow associated with the new program to ensure the machine learning engine tags the data flow as "allowed."

The machine learning engine 150 includes data flow evaluation logic 152 to evaluate data flows in the system 100 by applying a machine learning model 154 to the data flow. The data flow evaluation logic 152 detects a new data flow, identifies a device cluster associated with the new data flow, and applies ML model 154 to the data flow to generate a policy (e.g. "allow" or "deny" transmission of the data flow to an intended destination) for the device cluster. Enforcement point selection logic 153 applies the ML model 154 to the data flow to identify one or more enforcement points at which to enforce the policy generated by the data flow evaluation logic 152.

A policy syntax module 135 converts a policy into a syntax for a particular platform or client in the system. Examples of the types of devices, platforms, and services that are capable of implementing a security policy to allow or deny the transmission of a data flow, and may each require a different syntax to implement the security policy, include: different switch providers (e.g. an HP™ switch vs. a Cisco™ switch), different firewall providers (e.g. Cisco ASA™ Juniper™, Palo Alto™, Fortinet™, Check Point™), different controller providers (e.g. Cisco™ wireless controllers, Aruba Networks™ wireless controllers), and different network access control (NAC) system providers (e.g. Cisco ISE™, Aruba Networks CPPM™).

In one or more embodiments, the security manager 130 may output security policy information to a user via the user interface 136 to allow the user to override security policies implemented by the machine learning models 154. In one or more embodiments, the user inputs may be added to subsequent training data sets 141 to generate new machine learning models 154.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or may execute on the same computing system as the security manager 130. Alternatively, or additionally, a data repository 140 may be implemented or executed on a computing system separate from the security manager 130. A data repository 140 may be communicatively coupled to the security manager 130 via a direct connection or via a network.

In one or more embodiments, the security manager 130 refers to hardware and/or software configured to perform operations described herein for analyzing data flows in a system, creating machine learning models based on historical data flow information, and generating policies for subsequently-received data flows. Examples of operations for analyzing data flows in a system, creating machine learning models based on historical data flow information, and generating policies for subsequently-received data flows are described below with reference to FIG. 2.

In an embodiment, the security manager 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/ or transmitter, a base station, a communication management device, a router, a switch, a controller, an access point, and/or a client device.

In one or more embodiments, interface 136 refers to hardware and/or software configured to facilitate communications between a user and the security manager 130. The interface 136 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 136 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 126 is specified in one or more other languages, such as Java, C, or C++.

In one or more embodiments, the system 100 hosts different tenants. A tenant is a corporation, organization, enterprise or other entity that accesses a shared computing resource, such as devices 101*a*-101*g*. In an embodiment, tenants accessing the devices 101*a*-101*g* are independent from each other. A business or operation of one tenant is separate from a business or operation of another tenant.

Figure 2A:
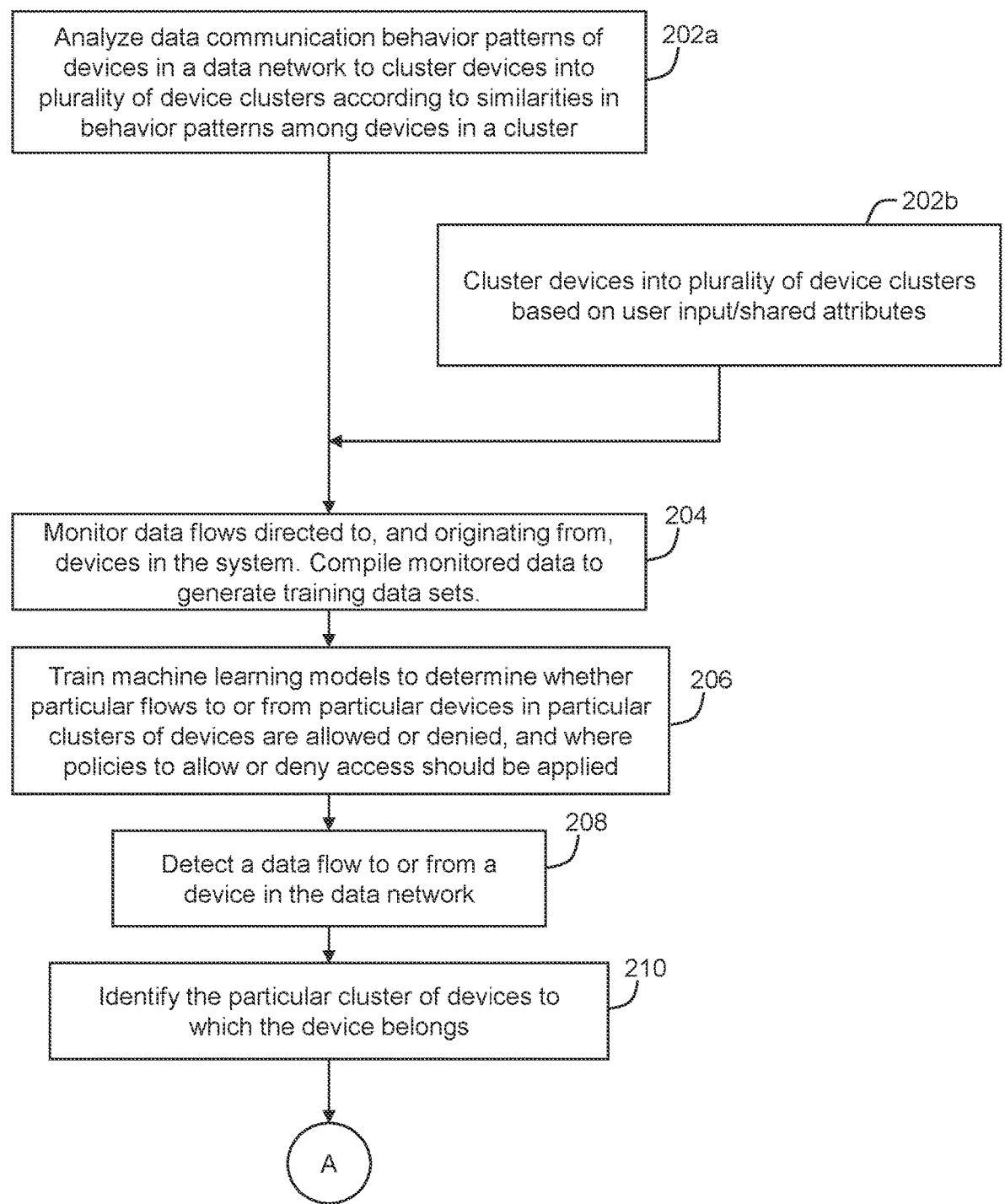
FIGS. 2A and 2B illustrate an example set of operations for analyzing data quality in accordance with one or more embodiments.
Figure 2B:
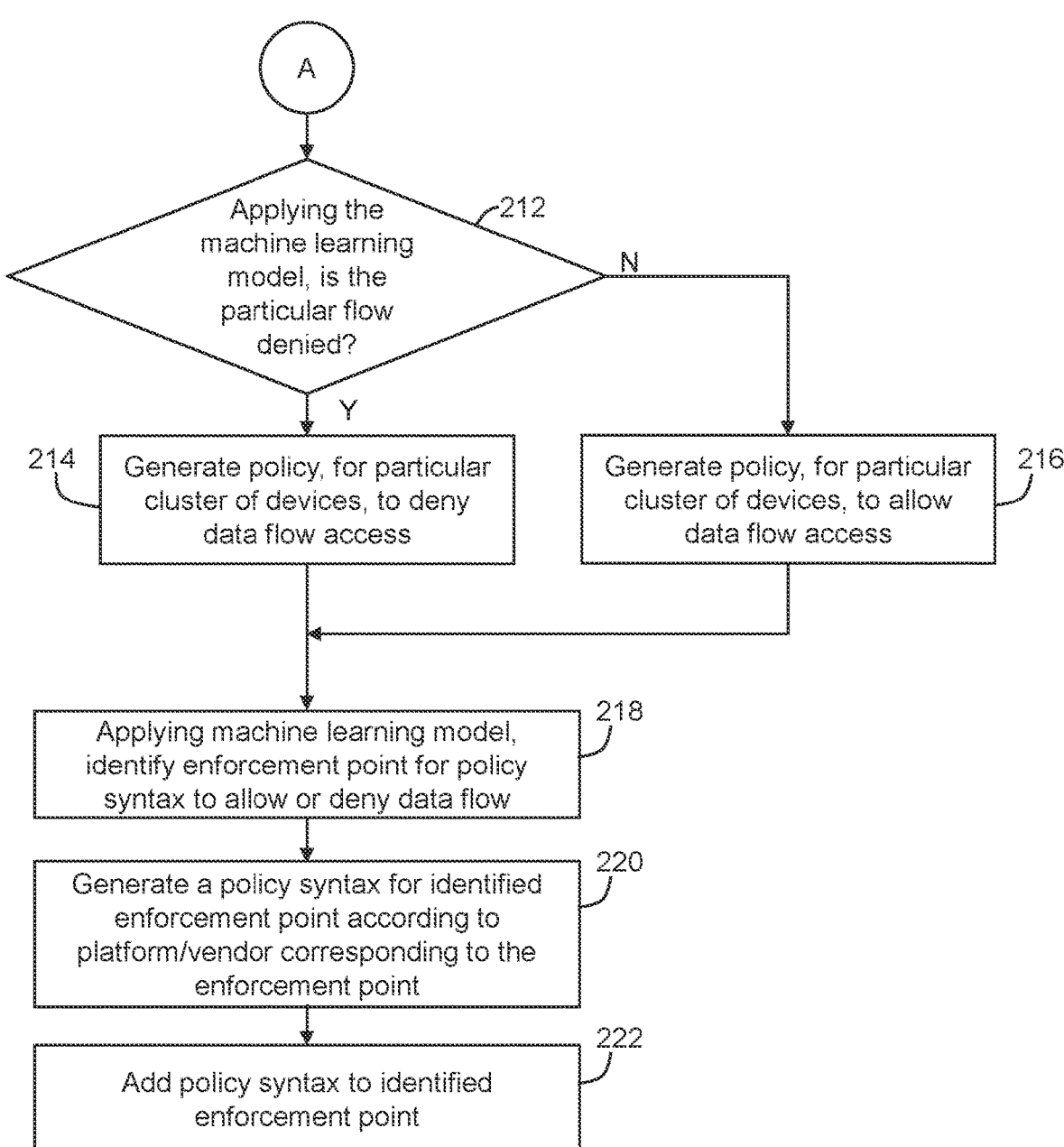

3. Analyzing Devices and Data Flows to Generate and Enforce System Security Policies FIGS. 2A and 2B illustrate an example set of operations for analyzing and categorizing data flows in a system to generate and enforce security policies, in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A security manager, in a system including multiple devices and multiple policy-enforcement points, analyzes data communication behavior patterns of the devices in the system. The security manager clusters the devices into device clusters according to similarities in behavior patterns among devices in each respective device cluster (Operation 202*a*). In one or more embodiments, the clustering is performed by a process of unsupervised machine learning, such as k-means clustering. Examples of behavior patterns that may inform the process of organizing the devices into clusters includes: how often the devices access a network, how much data do the devices typically transmit/receive, where do the devices transmit data, from which sources do the devices receive data, what times of day do the devices access other devices, do the devices access resources outside a local network, what types of data do the devices transmit/receive, and what functions do the devices perform.

In addition, or in the alternative, the security manager may cluster devices into device clusters based on user input and/or shared attributes (Operation 202*b*). For example, a user may provide input to group specific devices together. Alternatively, or in addition, the devices may be grouped by attributes that are not based on behavior patterns. Examples of attributes that are not based on behavior patterns include: geographic location of the devices, an owner of the devices, a time when a device was added to a network, and a type of the device, regardless of how the device behaves in the network. For example, a user may indicate that every device managed by the security manager in a particular room is in a same cluster of devices. A handheld device, a medical imaging device, and a personal computer, which may all have different network behaviors, may be clustered together. In addition, if the security manager detects a new device that meets the predetermined cluster attribute, that is not based on similarities in device behavior, the security manager may automatically add the device to the device cluster. For example, if the security manager senses a new laptop located in the room that has previously been defined as a defining attribute of a device cluster, the new laptop may automatically be added to the device cluster without further user input.

The security manager monitors data flows in the system (Operation 204). The security manager identifies attributes of the data flows, including: data flow sources, data flow intended destinations, data flow content, a security risk level of the data flow, a priority level of the data flow, a number of devices in the system that would be affected by the data flow (e.g. a number of devices to which a source device would have access if a data flow were permitted to be sent to its intended destination address(es)), and types of devices to which the data flow is addressed. The security manager may identify data flows that originate from a network external to the system and flows that originate from within the system. The security manager may identify multicast data flows. The security manager may identify when a data flow is associated with a group of peer devices.

The security manager also identifies whether the data flows are labeled with a security policy indication, such as whether the data flow is "allowed" to be transmitted to an intended destination or "denied" permission to be transmitted to the intended destination. The security manager further identifies an enforcement point in the system where the security policy for the data flow is enforced. The security manager compiles the monitored information about the data flows over a period of time to be stored as historical data. The historical data is used to create one or more training data sets for a machine learning engine.

The machine learning engine uses the training data sets to train one or more machine learning (ML) models (Operation 206). The ML models identify whether particular flows to, or from, particular device clusters should be assigned a security policy of being "allowed" to be transmitted to an intended destination or "denied" permission to be transmitted to the intended destination. The ML models further identify particular enforcement points in the system where the policies should be implemented.

For example, in one data flow, one device within a data network sends a message to another device in the data network. The machine learning model may identify a switch within the data network to enforce security policies for the data flow that originated from within the data network. In another example, in a second data flow, a device outside a data network may request access to data of a particular type within the data network. The machine learning model may identify a firewall to enforce security policies for the second data flow originating from outside a data network to a device located within the data network. In a third data flow, a particular type of data may be analyzed using deep packet inspection. The machine learning model may identify a firewall as a location to enforce a security policy to allow or deny the third data flow. In a fourth data flow, data may be forwarded from one device to another without performing a virus check. The machine learning model may identify multiple enforcement points, such as both a firewall and a local switch, to enforce a policy to allow or deny the fourth data flow. The machine learning model may identify multiple enforcement points, such as both a firewall and a switch inside a data network, to enforce a security policy to prevent a data flow identified as being high-risk from being transmitted to a device within the data network. The machine learning model may identify multiple enforcement points, such as multiple local switches and a wireless controller to apply a security policy to devices in a cluster of devices located at multiple different locations. The machine learning model may identify the device, itself, as the enforcement point for a data flow that would affect only the one device. The machine learning model may identify an enforcement point to enforce a security policy based on historical data about the success and failure of enforcing the security policy at different enforcement points. For example, the machine learning model may identify one enforcement point as having a high likelihood of failure to enforce a security policy (e.g. a data flow may be able to circumvent the enforcement point). Alternatively, the machine learning model may identify another enforcement point as having a high likelihood of success in enforcing a particular security policy.

The security manager monitors the system to identify a new data flow to, or from, a device in the system (Operation 208). The security manager may monitor enforcement points in the system, devices in the system, or any components within the system to identify the data flows. The security manager identifies attributes of the data flows, as discussed above, including a source, or intended destination, of the data flow, a risk level of the data flow, a data type of the data flow, etc.

The security manager identifies the cluster of devices to which the particular device that is the source, or the intended destination, of the data flow belongs (Operation 210). For example, in one embodiment, the security manager stores a table listing each device in the system and the cluster of devices to which the device belongs, based on the previously-generated device clusters.

The security manager applies a machine learning model for a particular cluster of devices to the identified data flow and determines whether the data flow should be allowed/denied access to its intended destination (Operation 212). For example, the machine learning model may indicate that any data flow originating from a social media site should be denied access to a cluster of devices that includes cameras in a data network. As another example, the machine learning model may indicate that only a data flow originating from a device inside a data network should be allowed access to a cluster of devices including a particular database within the data network.

If the security manager determines that a particular data flow should be denied access to its intended destination, the security manager generates a security policy to deny the data flow access to the intended destination (Operation 214). Generating a security policy may include generating a statement or code identifying the data flow and the cluster of devices to which the data flow is to be denied access.

If the security manager determines that a particular data flow should be allowed to be transmitted to its intended destination, the security manager may generate a policy to allow the data flow access to the intended destination (Operation 216). In the alternative, the security manager may generate no policy, and the absence of a security policy may result in the data flow being allowed access to its intended destination.

The security manager applies the machine learning model to the data flow to identify an enforcement point where a policy of allowing or denying the data flow access to its intended destination should be applied (Operation 218). For example, the machine learning model may indicate that a security policy directed to only one cluster of devices outside a data network may be applied at a firewall level. In addition, or in the alternative, the machine learning model may indicate that a security policy affecting a relatively high number of devices in a data network should be applied at a high-level enforcement point, such as the firewall, prior to reaching any switches in the data network. The machine learning model may indicate that any security policy directed to a data flow originating in the data network should be applied at a switch within the data network. For example, a security policy for a data flow originating from a telephone or workstation in a datacenter (such as a VM running on a data network server) may be enforced at a local switch in the data network. In addition, or in the alternative, machine learning model may indicate that any security policy of a predetermined high-risk should be applied at multiple different enforcement points to provide redundant security in the data network. The machine learning model may identify a firewall as the enforcement point of a security policy for a data flow that includes a domain name.

The security manager generates a policy syntax for the identified enforcement point according to the type of device, the platform, or the vendor associated with the enforcement point (Operation 222). For example, a policy syntax for a wireless controller is different than the policy syntax, for the same data flow, to a firewall or a local switch. In addition, if the enforcement point is a switch in a data network, the security manager would generate a different policy syntax to be written to an HP™ switch than a Cisco™ switch.

The security manager applies the policy syntax to the indicated enforcement point(s) (Operation 222). In an embodiment in which the policy is applied to multiple devices in different locations, a separate policy syntax may be generated and applied to the respective enforcement points for each of the devices in the device cluster. For example, two devices in the device cluster may be connected to a one type of switch, and two devices may be connected to another type of switch. The security manager applies one policy syntax to one type of switch and another policy syntax to the other type of switch. The policy syntaxes are based on the same policy applied to the same cluster of devices.

4. Machine Learning Engine Training

Figure 3:
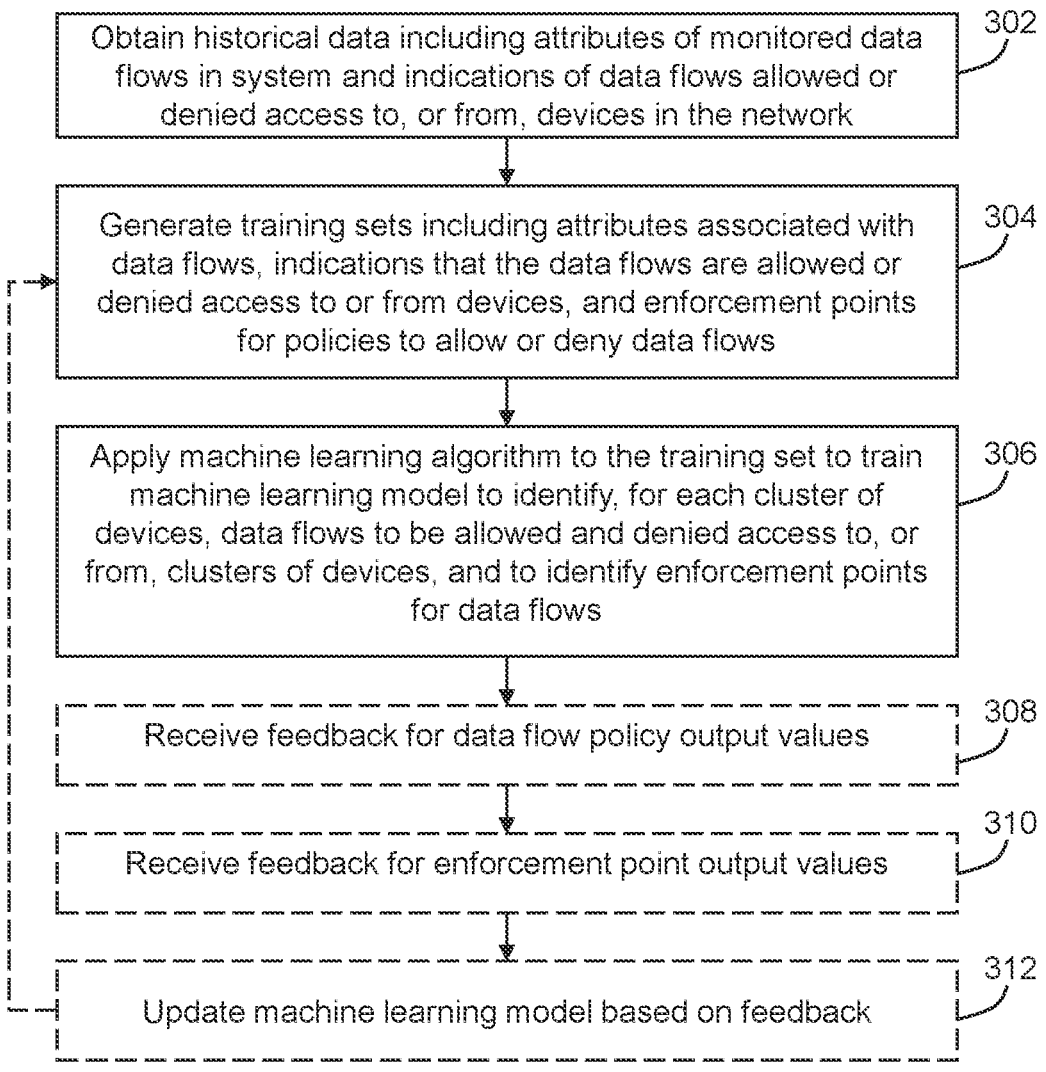
FIG. 3 illustrates an example a set of operations for training a machine learning model to identify allowed and denied data flows and to identify policy enforcement points in accordance with one or more embodiments.

FIG. 3 illustrates an example of operations for training a machine learning model to analyze device clusters and data flows, and to generate a security policy and an enforcement point for data flows.

A machine learning engine obtains historical data including attributes of monitored data flows (Operation 302). The attributes of the monitored data flows include: data flow sources, data flow intended destinations, data flow content, a security risk level of the data flow, a priority level of the data flow, a number of devices in the system that would be affected by the data flow (e.g. a number of devices to which the data flow would have access if sent to its intended destination address(es)), types of devices to which the data flow is addressed, and locations of devices to which the data flow is addressed. The historical data includes indications of whether a particular data flow as allowed or denied access to its intended destination. The indications of whether the particular data flows were allowed or denied may be provided by a user, such as a system administrator. In addition, or in the alternative, a security software application may provide indications that one or more data flows are denied access to devices. For example, known sources of viruses or malware may be tagged as denied access to devices in the system by a security application. The historical data further includes an enforcement point at which security policies to allow or deny the data flows were implemented.

The machine learning engine generates training data sets based on the historical data (Operation 304). The training data sets may include subsets of the historical data selected to represent different types of data flows and different device clusters destinations of the data flows. The training data sets also include the indications regarding where security policies to allow and deny data flows were enforced.

The machine learning engine applies a machine learning algorithm to the training set to train a machine learning model to identify, for each cluster of devices: (1) data flows that are to be allowed or denied access to the device cluster, and (2) the enforcement point(s) where security policies to allow or denied data flows are to be enforced (Operation 306). In one embodiment, applying the machine learning algorithm to the training set results in output values, for a respective data flow and device cluster, indicating whether the data flow is allowed or denied and where the policy to allow or deny the data flow is to be enforced. The output values are compared with target values, and parameters of the model are adjusted based on the comparison.

In one embodiment, the ML model receives feedback based on the output values of the target values. For example, the values for whether to allow or deny a data flow to a particular device cluster may be output to a user (Operation 308). The user may correct, approve, or adjust the values to provide target values for the machine learning model.

In addition, or in the alternative, the machine learning engine may provide a user with the value(s) for where a policy to allow or deny a data flow should be enforced (Operation 310). The user may correct, approve, or adjust the values to provide target values for the machine learning model.

In addition, or in the alternative, the output values may be compared to known target values, and the machine learning engine may automatically adjust the parameters of the model without user input. Based on comparing the output values with the target values, the machine learning engine updates the machine learning model (Operation 312).

The machine learning engine applies the updated machine learning model to the training datasets and repeats the process of comparing output values to target values, receiving feedback, and updating the machine learning model. In one or more embodiments, the machine learning model is subsequently compared to a validation dataset to validate and refine the machine learning model. In one or more embodiments, the machine learning model may be compared with a final test dataset prior to applying the machine learning model to incoming data flows.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
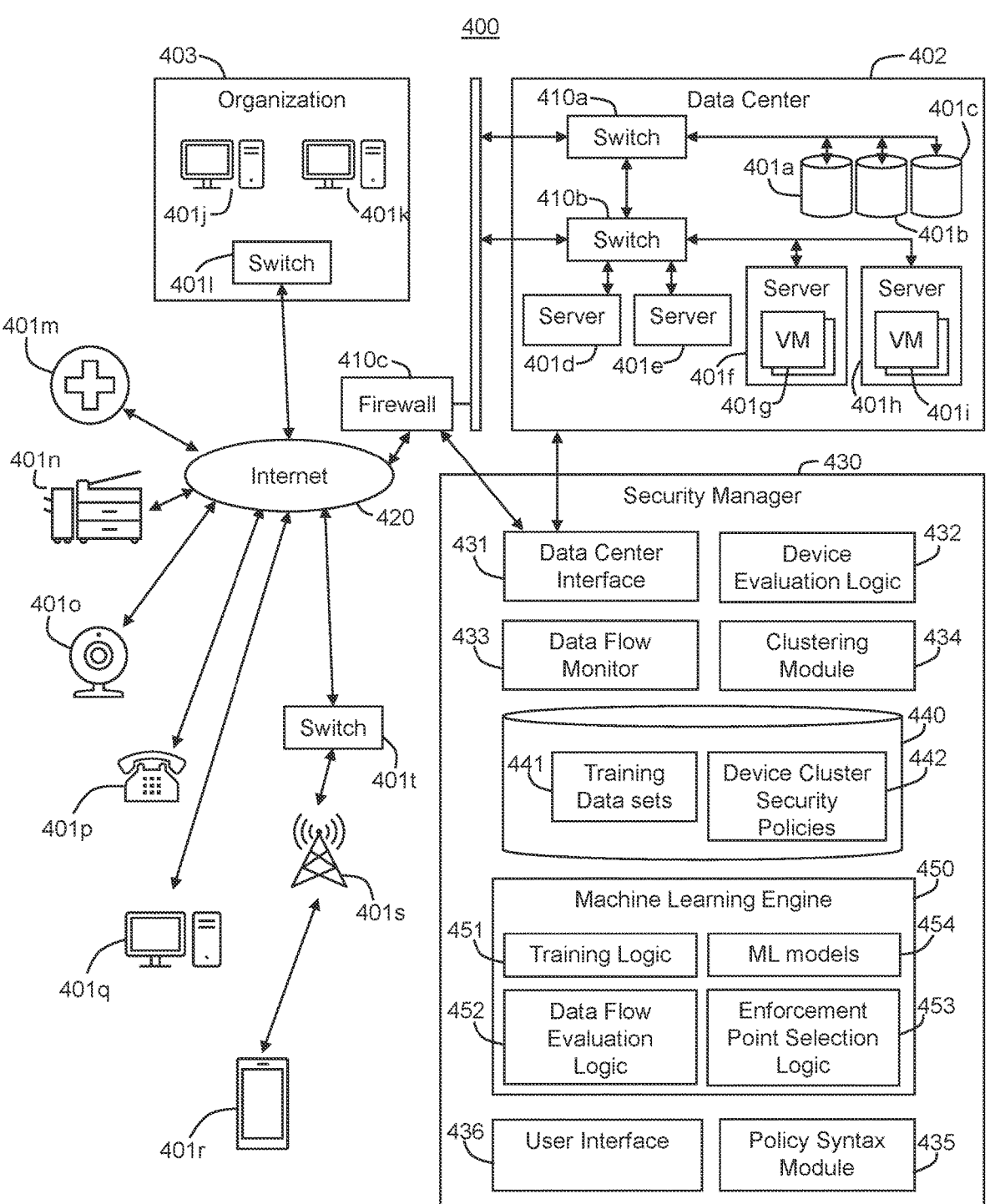
FIG. 4 illustrates an example of a system in according to one or more embodiments.

FIG. 4 illustrates a system 400 according to an example embodiment. The system includes devices 401a-401r. The devices (collectively, 401) are located in various locations, including a data center 402, within an organization facility 403, and at remote locations connected via the Internet 420. A security manager 430 is in communication with devices located in the data center 402 and with a firewall 410c to control security policies associated with the data center 402.

The data center includes databases 401a-401c. A switch 410a controls access to the databases 401a-401c. The data center 402 also includes application servers 401d and 401e running applications accessible by devices inside and outside the data center 402. Virtual machine (VM) servers 401f and 401h run instances of virtual machines 401g and 401i. The VM instances 401g and 401i may allow remote devices, such as computing devices 401j, 401k, and 401q, to run applications located in the data center 402. A switch 410b controls access to and from the servers 401d, 401e, 401f, and 401h.

A firewall 410c applies security policies for data flows into, and out from, the data center 402. The firewall 410c is connected to the Internet 420. An organization 403 includes on-site computing devices 401j and 401k. A switch 4011 controls access of data flows to, and from, the devices 401j and 401k.

Other devices may communicate with the data center 402 via the Internet 420, including medical imaging devices 401m, printers, scanners, and other imaging devices 401n, cameras and video capture devices 401o, telephones 401p, desktops, laptops, and other computing devices 401q, and handheld devices 401r. For example, a handheld device 401r may be a cellular phone that connects to the Internet 420 via a cellular tower 401s and a switch 401t.

The security manager 430 communicates with the devices in the data center 402 and with the firewall 410c via the data center interface 431.

The device evaluation logic 432 analyzes device attributes, such as behavior patterns of the devices 401a-401r, and identifies similarities among behavior patterns of the devices 401a-401r.

The clustering module 433 analyzes the device attributes, including the behavior patterns of the devices, and organizes the devices into device clusters according to common behavior patterns. For example, the clustering module 433 may generate a device cluster of the databases 401a-401c based on similarities of behaviors of the databases. The clustering module 433 may generate another device cluster of the user terminals 401j, 401k, and 401q based on the similarities in behavior patterns of the user terminals. The clustering module 433 may generate one device cluster for servers 401d and 401e and another device cluster for servers 401f and 401h. Similarly, medical imaging devices 401m may be clustered in a separate cluster from other types of video capture devices 4010 based on different network behavior characteristics.

The security manager 430 monitors the data flow in the system using the data flow monitor 433. The data flow monitor identifies attributes of data flows and security policies applied to the data flows. For example, the data flow monitor 433 may determine that a social media site connected to the Internet 420 requested access to the medical imaging device 401m and was denied. The data flow monitor 433 may determine that the same social media site connected to the Internet 420 requested access to the server 401f running the VM instance 401g and the access was allowed. The data flow monitor 433 may determine that the user terminal 401q was allowed access to the database 401a but was denied access to the database 401c. The data flow monitor 433 may determine that a device having a particular IP address requested access, via the Internet 420, to the databases 401a and 401b and was denied access.

The security manager 430 gathers the monitored data flow information to generate one or more training data sets 441 to train machine learning models 454.

Training logic 451 uses the training data sets 441 to train machine learning (ML) models 454 to identify a security policy for a data flow—whether to allow or deny the data flow to be transmitted to an intended destination device. The ML models 454 also identify one or more enforcement points among the enforcement points 410a-410c in the system where the security policy should be implemented.

In one or more embodiments, a user may provide feedback to the ML models 454 via a user interface 436. For example, in the process of training the machine learning model, the machine learning engine 450 may output values for a security policy for a data flow (e.g. whether the data flow is allowed or denied) and an enforcement point where the security policy should be enforced to the user via the user interface 436. The user may modify results, such as by changing a particular type of data flow from "allowed" to "denied" or changing an enforcement location from "firewall" to "network controller." The security manager 450 may update the training data sets 441 based on the user feedback, and the training logic 451 may generate a new set of ML models 454 based on the updated training data sets 441.

Upon training a machine learning model, the data flow monitor 433 detects a new data flow and the machine learning engine applies the trained ML model to the data flow. The machine learning engine 450 indicates whether the detected new data flow should be allowed or denied and where the security policy should be enforced. For example, the data flow monitor 433 may detect a data flow from an IP address connected to the Internet 420 requesting access to the database 401c. The ML model 454 may indicate that: (1) the database 401c belongs to a cluster of devices including databases 401a and 401b, (2) data flows originating from the IP address should be denied access to the cluster of devices, including database 401c, and (3) the policy should be enforced at the switch 410a. The policy syntax module 435 generates a policy syntax to be run on the switch 410a to deny the data flow access to the databases 401a-401c.

The data flow monitor 433 may detect a data flow from the same IP address requesting access to the server 401f. The ML model 454 may indicate that: (1) the server 401f belongs to a cluster of devices including servers 4011f and 401h, (2) data flows from the IP address should be allowed to be transmitted to the cluster of devices, and (3) the policy should be enforced at the firewall 410c and the switch 410b. The policy syntax module 435 generates a policy syntax to be run on the firewall 410c to allow the data flow access to the servers 401f and 401h. In one embodiment, the policy syntax module 435 also generates a policy syntax to be run on the switch 410b to allow the data flow access to the servers 401f and 401h.

In one or more embodiments, the data repository 440 stores, for each device cluster, a set of security policies 442 identifying which flows are denied access to the device cluster and where the security policies are enforced. The security manager 430 identifies which security policies are to be enforced at different enforcement points and partitions the security policies according to different enforcement points. The policy syntax module 435 generates a separate policy syntax 435 to be run or executed at the respective enforcement points. Accordingly, one device cluster may have security policies for different data flows enforced at different enforcement points.

In addition, or in the alternative, different device clusters may have different security policies for the same data flows. For example, a data flow that is denied access to one device cluster may be allowed access to another device cluster. The security policies denying the access and allowing the access may be implemented within the same enforcement point or at different enforcement points.

6. Computer Networks and Cloud Networks

In one or more embodiments, the system 100 may be implemented over a computer network. The computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
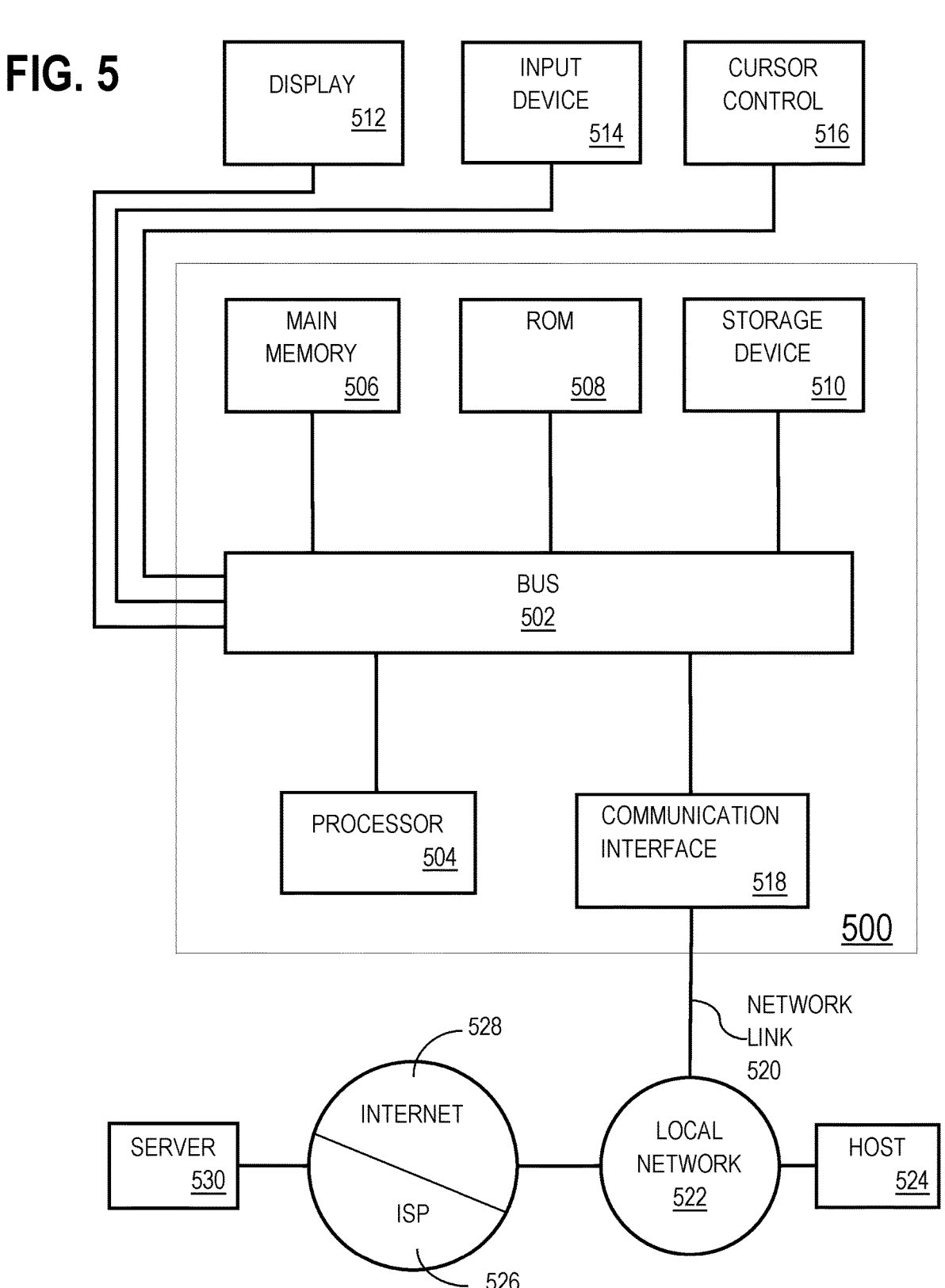
FIG. 5 illustrates a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface

518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause performance of operations comprising:

analyzing behavior for each of a set of devices to generate a plurality of clusters of devices for applying policies;

for each particular cluster of devices in the plurality of clusters of devices:

training a machine learning model to generate a policy indicating whether a particular data flow associated with a device in the particular cluster of devices is allowed or denied at least by:

obtaining training data sets of historical device data, each training data set comprising:

a data flow corresponding to at least one device in the particular cluster of devices, the data flow being associated with a set of data flow attributes;

an indication of whether the data flow was allowed or denied;

training the machine learning model based on the training data sets;

detecting a first data flow corresponding to a first device of the set of devices;

determining the first device corresponds to a first cluster of devices of the plurality of clusters of devices;

identifying a first trained machine learning model corresponding to the first cluster of devices;

applying the first trained machine learning model to the first data flow to generate a first policy indicating whether the first data flow is to be allowed or denied;

allowing or denying the first data flow based on the first policy.

2. The one or more machine-readable media of claim 1, wherein each training data set further identifies an enforcement point that allows or denies the data flow;

wherein the operations further comprise applying the first trained machine learning model to the first data flow to identify a first enforcement point for the first data flow;

wherein allowing or denying the first data flow is performed by the first enforcement point.

3. The one or more machine-readable media of claim 2, wherein the instructions further cause:

detecting a second data flow corresponding to a second device of the set of devices;

wherein the operations further comprise applying the first trained machine learning model to the second data flow to identify a second enforcement point for the second data flow;

wherein allowing or denying the second data flow is performed by the second enforcement point.

4. The one or more machine-readable media of claim 2, wherein the instructions further cause:

detecting a second data flow corresponding to the first device of the set of devices;

wherein the operations further comprise applying the first trained machine learning model to the second data flow to identify a second enforcement point for the second data flow;

wherein allowing or denying the second data flow is performed by the second enforcement point.

5. The one or more machine-readable media of claim 1, wherein each training data set further comprises:

an enforcement point for allowing or denying the data flow; and an indication whether enforcement of the allowing or the denying of the data flow was successful;

wherein the operations further comprise applying the first trained machine learning model to the first data flow to identify a first enforcement point for the first data flow;

wherein allowing or denying the first data flow is performed by the first enforcement point.

6. The one or more machine-readable media of claim 1, wherein the set of data flow attributes comprises at least one attribute, comprising:

a security risk of the data flow;

a priority level of the data flow;

a destination of the data flow;

a source of the data flow; and a number of devices, among the set of devices, accessed by the data flow;

wherein training the machine learning model comprises identifying a pattern associating the at least one attribute with the indication of whether the data flow is to be allowed or denied.

7. The one or more machine-readable media of claim 1, wherein each training data set further comprises at least one device attribute comprising:

a function of the at least one device;

a location of the at least one device;

an application running on the at least one device;

data stored in the at least one device; and a level of importance of the at least one device relative to other devices in the particular cluster of devices;

wherein training the machine learning model comprises identifying a pattern associating the at least one device attribute with the indication of whether the data flow is to be allowed or denied.

8. One or more non-transitory machine-readable media storing instructions which, when executed by one or more processors, cause performance of operations comprising:

analyzing behavior for each of a set of devices to generate a plurality of clusters of devices for applying policies;

for each particular cluster of devices in the plurality of clusters of devices:

training a machine learning model to select enforcement points for applying policies for allowing or denying data flows at least by:

obtaining training data sets of historical device data, each training data set comprising:

a data flow corresponding to at least one device in the particular cluster of devices, the data flow being associated with a set of data flow attributes;

an identification of an enforcement point for enforcing policies of allowing or denying the data flow;

training the machine learning model based on the training data sets;

detecting a first data flow corresponding to a first device of the set of devices;

determining the first device corresponds to a first cluster of devices of the plurality of clusters of devices;

identifying a first trained machine learning model corresponding to the first cluster of devices;

applying the first trained machine learning model to the first data flow to select, by the first trained machine learning model, a first enforcement point for a first policy indicating whether to allow or deny the data flow;

allowing or denying, by the first enforcement point, the first data flow.

9. The one or more machine-readable media of claim 8, wherein the instructions further cause:

detecting a second data flow corresponding to a second device of the set of devices;

wherein the operations further comprise applying the first trained machine learning model to the second data flow to select a second enforcement point for the second data flow;

wherein allowing or denying the second data flow is performed by the second enforcement point.

10. The one or more machine-readable media of claim 8, wherein the instructions further cause:

detecting a second data flow corresponding to the first device of the set of devices;

wherein the operations further comprise applying the first trained machine learning model to the second data flow to select a second enforcement point for the second data flow;

wherein allowing or denying the second data flow is performed by the second enforcement point.

11. The one or more machine-readable media of claim 8, wherein each training data set further comprises:

an enforcement point for allowing or denying the data flow; and an indication whether enforcement of the allowing or the denying of the data flow was successful;

wherein training the machine learning model comprises identifying a pattern associating the enforcement point with the indication whether enforcement of the allowing or the denying of the data flow was successful.

12. The one or more machine-readable media of claim 8, wherein the set of data flow attributes comprises at least one attribute, comprising:

a security risk of the data flow;

a priority level of the data flow;

a destination of the data flow;

a source of the data flow; and a number of devices, among the set of devices, accessed by the data flow;

wherein training the machine learning model comprises identifying a pattern associating the at least one attribute with the indication of whether the data flow is to be allowed or denied.

13. The one or more machine-readable media of claim 8, wherein each training data set further comprises at least one device attribute comprising:

a function of the at least one device;

a location of the at least one device;

an application running on the at least one device;

data stored in the at least one device; and a level of importance of the at least one device relative to other devices in the particular cluster of devices;

wherein training the machine learning model comprises identifying a pattern associating the at least one device attribute with the indication of whether the data flow is to be allowed or denied.

14. A method, comprising:

analyzing behavior for each of a set of devices to generate a plurality of clusters of devices for applying policies;

for each particular cluster of devices in the plurality of clusters of devices:

training a machine learning model to generate a policy indicating whether a particular data flow associated with a device in the particular cluster of devices is allowed or denied at least by:

obtaining training data sets of historical device data, each training data set comprising:

a data flow corresponding to at least one device in the particular cluster of devices, the data flow being associated with a set of data flow attributes;

an indication of whether the data flow was allowed or denied;

training the machine learning model based on the training data sets;

detecting a first data flow corresponding to a first device of the set of devices;

determining the first device corresponds to a first cluster of devices of the plurality of clusters of devices;

identifying a first trained machine learning model corresponding to the first cluster of devices;

applying the first trained machine learning model to the first data flow to generate a first policy indicating whether the first data flow is to be allowed or denied;

allowing or denying the first data flow based on the first policy.

15. The method of claim 14, wherein each training data set further identifies an enforcement point that allows or denies the data flow;

wherein the method further comprises applying the first trained machine learning model to the first data flow to identify a first enforcement point for the first data flow;

wherein allowing or denying the first data flow is performed by the first enforcement point.

16. The method of claim 15, further comprising:

detecting a second data flow corresponding to a second device of the set of devices;

applying the first trained machine learning model to the second data flow to identify a second enforcement point for the second data flow;

wherein allowing or denying the second data flow is performed by the second enforcement point.

17. The method of claim 15, further comprising:

detecting a second data flow corresponding to the first device of the set of devices;

applying the first trained machine learning model to the second data flow to identify a second enforcement point for the second data flow;

wherein allowing or denying the second data flow is performed by the second enforcement point.

18. The method of claim 14, wherein each training data set further comprises:

an enforcement point for allowing or denying the data flow; and an indication whether enforcement of the allowing or the denying of the data flow was successful;

wherein the method further comprises applying the first trained machine learning model to the first data flow to identify a first enforcement point for the first data flow;

wherein allowing or denying the first data flow is performed by the first enforcement point.

19. The method of claim 14, wherein the set of data flow attributes comprises at least one attribute, comprising:

a security risk of the data flow;

a priority level of the data flow;

a destination of the data flow;

a source of the data flow; and a number of devices, among the set of devices, accessed by the data flow;

wherein training the machine learning model comprises identifying a pattern associating the at least one attribute with the indication of whether the data flow is to be allowed or denied.

20. A system, comprising:

one or more processors; and memory storing instructions that, when executed by the one or more processors, cause the system to perform operations comprising:

analyzing behavior for each of a set of devices to generate a plurality of clusters of devices for applying policies;

for each particular cluster of devices in the plurality of clusters of devices:

training a machine learning model to generate a policy indicating whether a particular data flow associated with a device in the particular cluster of devices is allowed or denied at least by:

obtaining training data sets of historical device data, each training data set comprising:

a data flow corresponding to at least one device in the particular cluster of devices, the data flow being associated with a set of data flow attributes;

an indication of whether the data flow is to be was allowed or denied;

training the machine learning model based on the training data sets;

detecting a first data flow corresponding to a first device of the set of devices;

determining the first device corresponds to a first cluster of devices of the plurality of clusters of devices;

identifying a first trained machine learning model corresponding to the first cluster of devices;

applying the first trained machine learning model to the first data flow to generate a first policy indicating whether the first data flow is to be allowed or denied;

allowing or denying the first data flow based on the first policy.

21. One or more non-transitory machine-readable media storing instructions which, when executed by one or more processors, cause performance of operations comprising:

generating, for a set of devices, a plurality of clusters of devices for applying policies, wherein the plurality of clusters of devices is determined based on one or more of: user selection or shared attributes;

for each particular cluster of devices in the plurality of clusters of devices:

training a machine learning model to generate a policy indicating whether a particular data flow associated with a device in the particular cluster of devices is allowed or denied at least by:

obtaining training data sets of historical device data, each training data set comprising:

a data flow corresponding to at least one device in the particular cluster of devices, the data flow being associated with a set of data flow attributes;

an indication of whether the data flow is to be was allowed or denied;

training the machine learning model based on the training data sets;

detecting a first data flow corresponding to a first device of the set of devices;

determining the first device corresponds to a first cluster of devices of the plurality of clusters of devices;

identifying a first trained machine learning model corresponding to the first cluster of devices;

applying the first trained machine learning model to the first data flow to generate a first policy indicating whether the first data flow is to be allowed or denied;

allowing or denying the first data flow based on the first policy.

22. The media of claim 21, wherein the plurality of clusters of devices is generated based on at least one of:

a geographic location of the devices;

an owner of the devices; and a device type of the devices.

23. The media of claim 1, wherein the operations further comprise:

detecting a second data flow corresponding to a second device of the set of devices;

determining the second device corresponds to a second cluster of devices of the plurality of clusters of devices;

identifying a second trained machine learning model corresponding to the second cluster of devices;

applying the second trained machine learning model to the second data flow to generate a second policy indicating whether the second data flow is to be allowed or denied;

allowing or denying the second data flow based on the second policy.

* * * * *